US010924915B2

(12) United States Patent
Dimou et al.

(10) Patent No.: US 10,924,915 B2
(45) Date of Patent: Feb. 16, 2021

(54) EXCHANGE OF MOBILITY INFORMATION IN CELLULAR RADIO COMMUNICATIONS

(75) Inventors: Konstantinos Dimou, Stockholm (SE); Walter Müller, Upplands Väsby (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 805 days.

(21) Appl. No.: 14/236,920

(22) PCT Filed: Sep. 20, 2011

(86) PCT No.: PCT/SE2011/051125
§ 371 (c)(1),
(2), (4) Date: Feb. 4, 2014

(87) PCT Pub. No.: WO2013/022392
PCT Pub. Date: Feb. 14, 2013

(65) Prior Publication Data
US 2014/0160976 A1  Jun. 12, 2014

Related U.S. Application Data

(60) Provisional application No. 61/521,581, filed on Aug. 9, 2011.

(51) Int. Cl.
H04W 76/00 (2018.01)
H04W 8/08 (2009.01)
(Continued)

(52) U.S. Cl.
CPC ............ H04W 8/08 (2013.01); H04W 76/10 (2018.02); H04W 64/003 (2013.01)

(58) Field of Classification Search
CPC ..... H04W 36/32; H04W 76/02; H04W 36/30; H04W 24/10; H04W 64/00; H04W 4/02;
(Continued)

(56) References Cited

U.S. PATENT DOCUMENTS 7,212,818 B2    5/2007   Haumont
8,855,637 B2 * 10/2014   Robbins ............ H04W 36/0094
                                                      370/338
(Continued)

FOREIGN PATENT DOCUMENTS

CN   101507331 A    8/2009
CN   102100094 A    6/2011
(Continued)

OTHER PUBLICATIONS

ETSI, "Universal Mobile Telecommunications System (UMTS); Radio Resource Control (RRC); Protocol specification", ETSI TS 125 331 V10.4.0, Jul. 2011, 1123-1128.
(Continued)

Primary Examiner — Sai Aung
(74) Attorney, Agent, or Firm — Murphy, Bilak & Homiller, PLLC

(57) ABSTRACT

A connection request is received from a remote terminal of a radio communications system at a serving node of the radio communications system. Mobility information is requested (230) from the remote terminal based on receiving (200) the connection request. The requested mobility information is received (240) from the remote terminal, and the requested connection is established (250) with the remote terminal.

16 Claims, 5 Drawing Sheets

(51) Int. Cl.
*H04W 76/10* (2018.01)
*H04W 64/00* (2009.01)

(58) Field of Classification Search
CPC ... H04W 24/00; H04W 84/045; H04W 88/06; H04W 84/005
USPC .............................. 370/329; 455/441, 456.6
See application file for complete search history.

(56) References Cited

U.S. PATENT DOCUMENTS

| | | | | |
|---|---|---|---|---|
| 2002/0155831 | A1* | 10/2002 | Fodor | H04W 24/00 455/426.1 |
| 2003/0050064 | A1* | 3/2003 | Davies | H04W 36/12 455/441 |
| 2005/0037798 | A1* | 2/2005 | Yamashita | H04W 36/04 455/525 |
| 2007/0177494 | A1 | 8/2007 | Tomizawa et al. | |
| 2007/0287476 | A1* | 12/2007 | Jeong | H04W 76/02 455/456.6 |
| 2009/0201884 | A1 | 8/2009 | Chaponniere | |
| 2010/0067601 | A1* | 3/2010 | Koslov et al. | 375/267 |
| 2010/0124173 | A1 | 5/2010 | Agashe et al. | |
| 2010/0130205 | A1 | 5/2010 | Jung et al. | |
| 2010/0330982 | A1 | 12/2010 | Ishii et al. | |
| 2011/0122779 | A1 | 5/2011 | Meirosu et al. | |

FOREIGN PATENT DOCUMENTS

| | | | | |
|---|---|---|---|---|
| EP | 1850626 | A1 | 10/2007 | |
| JP | 2002159055 | A | 5/2002 | |
| JP | 2007208484 | A | 8/2007 | |
| JP | 2010530648 | A | 9/2010 | |
| WO | WO 2004064342 | A1 * | 7/2004 | ............. H04L 12/56 |
| WO | 2006137779 | A1 | 12/2006 | |
| WO | WO 2006137779 | A1 * | 12/2006 | ............... H04Q 7/38 |

OTHER PUBLICATIONS

Unknown, Author. "Universal Mobile Telecommunications System (UMTS) Radio Resource Control (RRC) Protocol specification." 3GPP TS 25.331 version 10.4.0 Release 10. Jul. 2011. pp. 1123-1125.

Unknown, Author. "High Speed Optimisation When Entering/Leaving CELL_DCH State." Vodafone Group. 3GPP TSG RAN WG2 #56. R2-063083. Nov. 6-10, 2006. pp. 1-3. Riga, Latvia.

* cited by examiner

EXCHANGE OF MOBILITY INFORMATION IN CELLULAR RADIO COMMUNICATIONS

TECHNICAL FIELD

The present disclosure relates to the field of information exchanges in cellular radio communications and, in particular, to obtaining information from user equipment regarding mobility of the user equipment.

BACKGROUND

The management and administration of wireless communications networks improves when controllers in the network possess more knowledge about users and User Equipments (UEs). This knowledge allows the network to adapt its settings for mobile UEs. The speed of movement of UEs, or rate of travel is useful for the tuning of several parameters, such as mobility triggers, e.g. for handover and cell reselection triggering, paging, discontinuous reception (DRX) parameters setting, deployment of new base stations, etc.

In Long Term Evolution (LTE), a mobility state, such a UE speed information can be available at the network but only on certain occasions. Information on the UE speed is included, for example, in the Measurement Report message transmitted by the UE. In the Measurement Report message, the UE reports, among other parameters, the location-info-r10. The location-info-r10 contains a field called horizontal Velocity which is estimated by positioning techniques, specified in 36.331 (3GPP TS 36.331, Third Generation Partnership Project Technical Specification No. 36.331). Information on the UE speed is reported by the UEs when a UE detects a radio link failure or a handover failure.

When a UE detects Radio Link Failure (RLF) to a HandoverFailure, then this cause is indicated by the RRC Connection Reestablishment Request message transmitted by the UE to the cell where the UE ends up during the RLF recovery procedure. The cell where the UE ends up during RLF recovery transmits all the latest measurements done by the UE prior to detecting the RLF. The measurements will include a horizontal Velocity information element. The information is transmitted via the message RLF Indication exchanged via X2 between the two cells, as specified within 3GPP TS 36.423 (X2 Application Protocol). Alternatively, the UE can transmit this information using a UE information RRC message.

The Handover Request message also has a UE History Information Element but it is only transmitted during a handover procedure and is sent by the eNB controlling the serving cell to the eNB controlling the target cell, as specified in 3GPP TS 36.423. The UE History information element contains a GCI (Global Cell Identifier) of the last N visited cells along with the time spent in each of these N cells. The maximum number of N is 16. While this information is not a direct measurement of speed or velocity, it can be used by the network as a rough estimate.

In each of the messages described above, the network receives knowledge of a UE's speed for certain purposes and on certain events, such as handover or RLF. The network does not have UE speed information for any UEs that are not experiencing these events.

UE speed information is also exchanged at a neighbor cell. This happens when a UE has detected RLF and the UE has landed at a neighbor cell. The neighbor cell forwards this information to the last serving cell of the UE in question for use in Mobility Robustness Optimization (MRO). The last serving cell uses this information to update its mobility triggers. The mobility triggers are the thresholds used in handover decisions. However, the serving cell is no longer serving this particular UE after RLF.

Even when information is received, it may not be accurate. The accuracy of the horizontal Velocity IE depends on the capabilities of the UE. The UE History information, on the other hand, allows the network to get an approximation of the UE speed by estimating the time the UE has stayed in the last N cells. However, cells can be of different sizes, and the UE might have crossed the entire cell or simply crossed a small part of it.

SUMMARY

It is an object to transfer mobility information from mobile devices to the network. The mobility information can take many different forms including a mobility state or horizontal velocity information element. The mobility state can be estimated by measuring a number of handovers over an interval of time or more directly using location or position information over time.

In one example a connection request is received from a user equipment (UE) of a radio communications system at a serving node of the radio communications system. Mobility information is requested from the UE based on receiving the connection request. The requested mobility information is received from the UE, and the requested connection is established with the UE.

In another example a serving node of a radio communications system has a receiver to receive a connection request from a user equipment (UE) of the radio communications system, a transmitter to transmit a request for mobility information from the UE based on receiving the connection request. The receiver receives the requested mobility information from the UE and a controller establishes the requested connection with the UE.

In another example mobility information is determined at a UE of the radio communications system in an idle mode. A connection request is sent to the serving node of the radio communications system. A request for mobility information is received from the serving node, and the estimated mobility information is sent to the serving node.

In another example a UE has a controller to determine mobility information in an idle mode. The UE also has a transmitter to send a connection request to the serving node of the radio communications system and a receiver to receive a request for mobility information from the serving node. The transmitter sends the estimated mobility information to the serving node.

Accurate or current information about the speed of the mobile devices in a network provides the advantage of allowing the network to be managed more efficiently. This includes managing handovers differently for mobile devices moving at different rates and setting various operational parameters of the mobile devices.

BRIEF DESCRIPTION OF THE DRAWINGS

The present disclosure may best be understood by referring to the following description and accompanying drawings.

DETAILED DESCRIPTION

Figure 1:
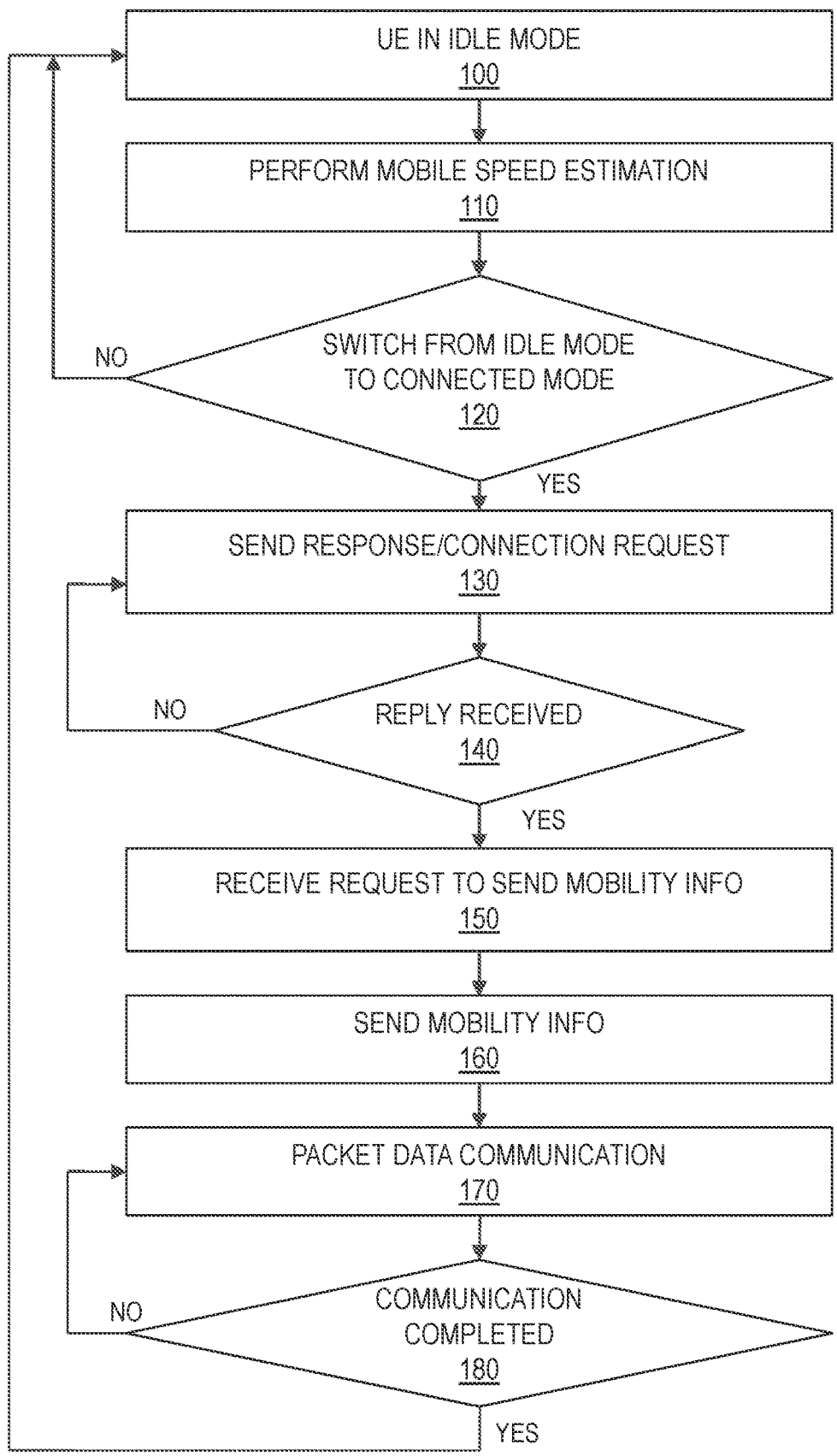
FIG. 1 is process flow diagram of sending mobility information from a UE to an eNB.

In the following description, numerous specific details such as logic implementations, opcodes, means to specify operands, resource partitioning/sharing/duplication implementations, types and interrelationships of system components, and logic partitioning/integration choices are set forth. It will be appreciated, however, by one skilled in the art that the different implementations may be practiced without such specific details. In other instances, control structures, gate level circuits and full software instruction sequences have not been shown in detail in order not to obscure the description.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

A user may communicate using user equipment (UE) via a communications system and send and receive data to other UEs in the system or outside the system. Access to the communications system may be provided by a fixed line or wireless communication interface, or a combination of these. Examples of wireless access systems providing mobility for UEs include cellular access networks, various wireless local area networks (WLANs), wireless personal area networks (WPANs), satellite based communication systems and various combinations of these. A communication system typically operates in accordance with a standard and/or a set of specifications and protocols which set out what the various elements of the system are permitted to do and how that should be achieved. For example, it is typically defined if the user, or more precisely user device, is provided with a circuit switched or a packet switched communications, or both. Also, the manner in which communication should be implemented between the user device and the various elements of the communication and their functions and responsibilities are typically defined by a predefined communication protocol. Various functions and features are typically arranged in a hierarchical or layered structure, so called protocol stack, wherein the higher level layers can influence the operation of the lower level functions.

In cellular systems, a network entity in the form of a base station provides a node for communication with mobile devices in one or more cells or sectors. In certain systems, a base station is called 'Node B'. Typically the operation of a base station apparatus and other apparatus of an access system required for the communication is controlled by a particular control entity, such as a base station controller, mobile switching center, or packet data support node.

The present disclosure is described in the context of the third generation (3G) mobile communications systems of the universal mobile telecommunications system (UMTS) and, in particular, long term evolution (LTE). A particular example of LTE is the Evolved Universal Terrestrial Radio Access (E-UTRA). An Evolved Universal Terrestrial Radio Access Network (E-UTRAN) includes E-UTRAN Node Bs (eNBs) which are configured to provide base station and control functionalities. However, the invention is not so limited.

In the following description and claims, the terms "UE" and "User Equipment" are used to refer to remote terminals, mobile devices or radios, subscriber equipment and any other type of mobile device that may connect to more than one cell and experience a handover. The term "handover" also includes "handoff." The term "eNB" or "cell" is used generally to refer to a base station, an access point, a fixed terminal and similar devices and to the area of radio coverage of a base station, a cell, or a sector. The description is presented in the context of LTE for illustration purposes, but the invention is not so limited.

In LTE, mobility is used to refer to handover and handover protocols in general, as in mobility robustness optimization (MRO). It is also used to refer to an information element that indicates the speed with which a UE moves through cells. The information element can have one of three values, high, medium, and low. This mobility is related to the speed with which the UE moves across the ground and to an LTE parameter referred to as horizontal velocity. In the following description and claims, mobility is used to refer to both handover in a general sense and the rate at which a UE travels. The rate at which a UE sends and receives data will be referred to in other terms, such as data rate, high or low traffic, etc.

The present disclosure presents a method in which UEs report their mobility state upon switching to RRC Connected Mode. The mobility state is estimated when in RRC idle mode. UEs are aware of their mobility state when in idle mode, as specified in 3GPP TS 36.304. As described herein, upon RRC connection, the network might ask a UE to report its estimated mobility state, e.g. its speed, among other information. UEs can report this information by using a message such as the Measurement Report. In addition, during handover, information on the mobility state may be included in the Handover Request message exchanged between serving and target cells.

Using these message exchanges, a network may have a complete image of user speed at the network. This information can be used for various purposes, such as setting paging areas, setting DRX, setting mobility triggers, determining network deployment strategies, etc. So, for example, when the network is aware of the UE speeds in the system it can optimize the paging. If the users within an area are moving very fast, then the paging area may be set to be large. Similarly, the DRX cycle of a given UE with no or very little date in its buffers may be set according to its average speed. Fast moving UEs may be set for longer DRX cycles than slowly moving ones.

In one example process for gathering UE speed, UEs report their speed, or mobility state when they switch from idle mode to connected mode. FIG. 1 is a simplified process flow diagram from the perspective of a UE. In FIG. 1 at 100, a UE is in RRC Idle Mode. While RRC modes and commands are described herein, the invention is not so limited and any of a wide range of different protocols and standards may benefit from the described techniques, processes, and systems.

At 110, the UE performs a mobile speed estimation, such as a mobility state estimation in the idle mode. The mobility state estimation compares a number of cells traversed (up to 16) to an elapsed time to obtain a value indicative of the speed of the UE. The mobility state has a value of high, medium, or low. The number of handovers in a given time is used to determine the mobility state as high, if there are many handovers, medium, if there are a medium number of handovers, and low, if there are few handovers during a given time window.

As an alternative, other speed estimations may be used by the UE. LTE defines an information element horizontal Velocity as specified in 3GPP TS 36.331. It is typically included in a UE history information element of a Handover Request message exchanged between cells via X2 as specified in 3GPP TS 36.423. Other measures and reporting formats may be used. The UE may directly measure its speed based on received communication or positioning signals, or on other factors.

At 120, the UE makes a decision whether the UE will switch from RRC idle mode to RRC connected mode. The decision is typically caused by a user request to send or receive data, but may also be caused by a page from the serving eNB or by administrative functions. If the UE is not transitioning from the idle mode, then the process returns to 100 and the UE stays in idle mode.

At 130, the UE sends either a page response or an RRC Connection Request to the serving eNB to establish the connection. The eNB will respond in different ways, depending upon which message was sent by the UE. In the event that the eNB is able to establish the connection at 140 it sends a message that the connection is granted. This message may include an uplink channel allocation, training and synchronization data, and other information.

At 150, the UE receives a request from the serving eNB to transmit mobility information back to the eNB. This request may be combined with the connection established message, or it may be sent as a separate message. In one example, the request is in the form of a Measurement Control message. The request can specify the particular information desired, such as mobility state, horizontal velocity, or other or additional parameters.

At 160, the UE complies with the request and sends the requested information. The serving eNB may use this information to its own ends or provide the information to the network over S1 or to other nodes via X2. Some example uses are mentioned above, however, the invention is not so limited.

At 170, the UE communicates packet data with the serving eNB. The established connection requested at 130 is used to complete the data transaction for which it was established. At 180, upon depletion of the data buffers or a timeout, the data transaction will be completed and the UE can return to idle mode.

The process flow diagram is simplified to show how to obtain mobility information from a UE immediately upon the UE moving from idle mode. There may be intermediate steps before or after any of the listed operations. The data communication may extend though various handovers and other interruptions, for example. In addition, the mobility information may be sent over an assigned uplink channel or using a random access channel or a control channel, depending on the particular implementation.

Figure 2:
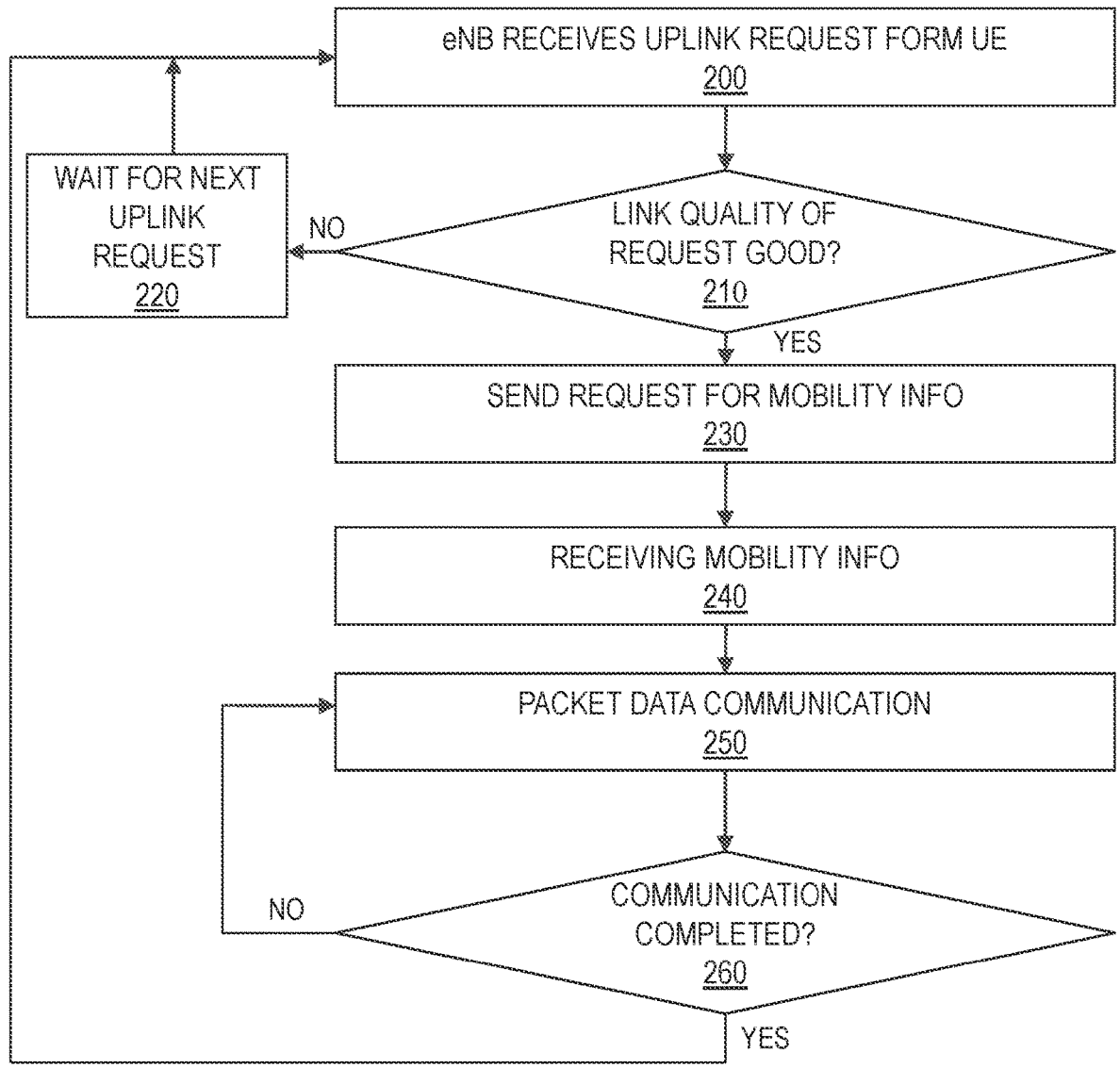
FIG. 2 is a process flow diagram of receiving mobility information from a UE at an eNB.

FIG. 2 is a simplified process flow diagram from the perspective of the serving eNB. At 200, the eNB receives a connection request or a page response from a UE. If the UE has been idle, then the eNB will have no recent information about its location and movement.

In one example, upon receiving, for example, an RRC Connection Request message from a given UE, the serving eNB at 230 asks the UE to report its estimated mobility state. Because the UE has just transitioned from idle mode, the most recent mobility state will likely be a mobility state estimated by the UE while the UE was in idle mode. The network may ask this from the UE using for example, a Measurement Control message, or in other forms. Other messages may also be used as alternatives, for example, a UE information message. E-UTRAN defines an UECapabilityInformation message which indicates to an eNB the radio access capabilities of the UE for different radio frequency band classes. As mentioned above, the request may be combined with a connection establishment and channel assignment message or it may be a separate message. The request for mobility information at 230 may take the form of a request for the UE's most recent Mobility State estimation, however as an alternative or in addition to the Mobility State, the eNB may request other information relating the speed at which the UE is moving. These include horizontal Velocity, and other speed measures, as mentioned above.

Intermediate operations may be performed between the connection request and the mobility state request. These operations may be associated with granting or denying the connection or with other operational issues. In the example of FIG. 2, the network first checks the link quality at 210. If, for example, a SINR (Signal to Interference and Noise Ratio) of the RRC Connection Request message is above a threshold, then the link quality is deemed to be good and the eNB will grant the connection request and request the mobility state. If not, then the eNB may give no reply or send a connection request rejection. Alternatively, as shown, if the link quality is not good enough, then the network waits. After a delay, or a wait, at 220 upon receiving another connection request at 200, or upon receiving packet data from the just connected UE and if the quality becomes better than the quality threshold, then the eNB will transmit the request for mobility state. The operation of checking the link quality 210 is optional. It allows the network to improve the probability of correctly receiving the mobility information. The quality threshold may be selected to prevent connections from being given to UE that cannot support a reliable connection. The particular threshold may be selected to suit a particular implementation.

At 240, a reply is received from the UE with the mobility state data and any necessary replies to any other aspects of the message from the eNB. The UE may reply using any of a variety of different types of information regarding mobility. The reply may include the information element horizontalVelocity and/or the information element mobilityState as specified in 3GPP TS 36.331 & 36.304, or any other type of speed or velocity estimation done internally at the UE, in particular one not already signaled to the network. These are typically included in the UE history information element of the Handover Request message exchanged via X2 as specified in 3GPP TS 36.423, however, they are not transmitted otherwise. In addition, if the network has estimated the speed of movement of the UE speed based, for example, on measuring uplink transmissions, then this information may already be known to the network. The network can combine all of this information and make average, instantaneous speed estimates.

At 250, the serving eNB communicates packet data with the UE. The established connection requested at 200 is used to complete the data transaction for which it was established. The establishment of the connection may occur with the request for mobility information at 230 or it may occur using other messaging (not shown). At 260, upon depletion of the data buffers or a timeout, the data transaction will be completed and the UE may return to idle mode. Additional operations may occur in conjunction with the packet data communication or as ancillary operations, including handovers, reconfiguration, assignment of parameters, etc.

Figure 3:
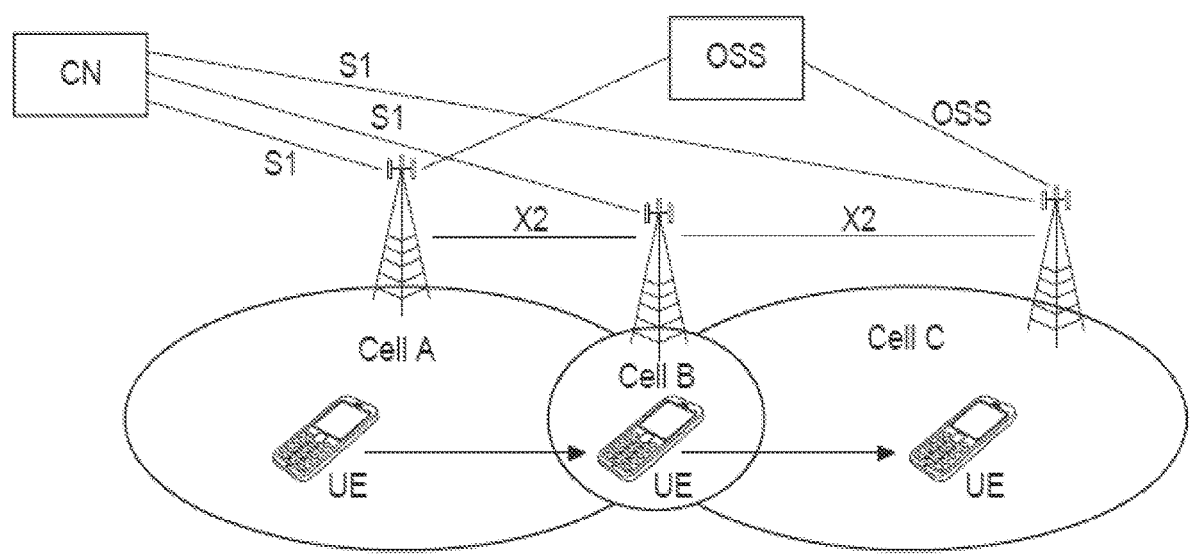
FIG. 3 is a simplified diagram of three radio communications system cells traversed by a UE and connected according to standards for UTRAN.

FIG. 3 is a diagram of the general configuration of the radio communications system. In FIG. 3, a UE is moving from Cell A to Cell B and then to Cell C as indicated by the arrows pointing to the right in the figure. Each cell has a base station illustrated as a tower, such as an eNB, or similar structure near the center of each of the three cells. While the base stations are shown as being near the center of each cell, they may alternatively define the sides of each cell using sectorized antennas or be in any other desired configuration. In E-UTRAN, different user equipment terminals (UE) are wirelessly connected to radio base stations (usually referred to as evolved NodeB (eNB)) and are handed over to different eNBs as they move from cell to cell, as shown. In E-UTRAN the radio base stations are directly connected to a core network (CN) via an S1 interface which controls the eNBs connected to it. The eNBs are also connected to each other via an X2 interface. An Operation and Support System (OSS) is logically connected to all the radio base stations as well as to the CN, via an OSS interface.

Figure 4:
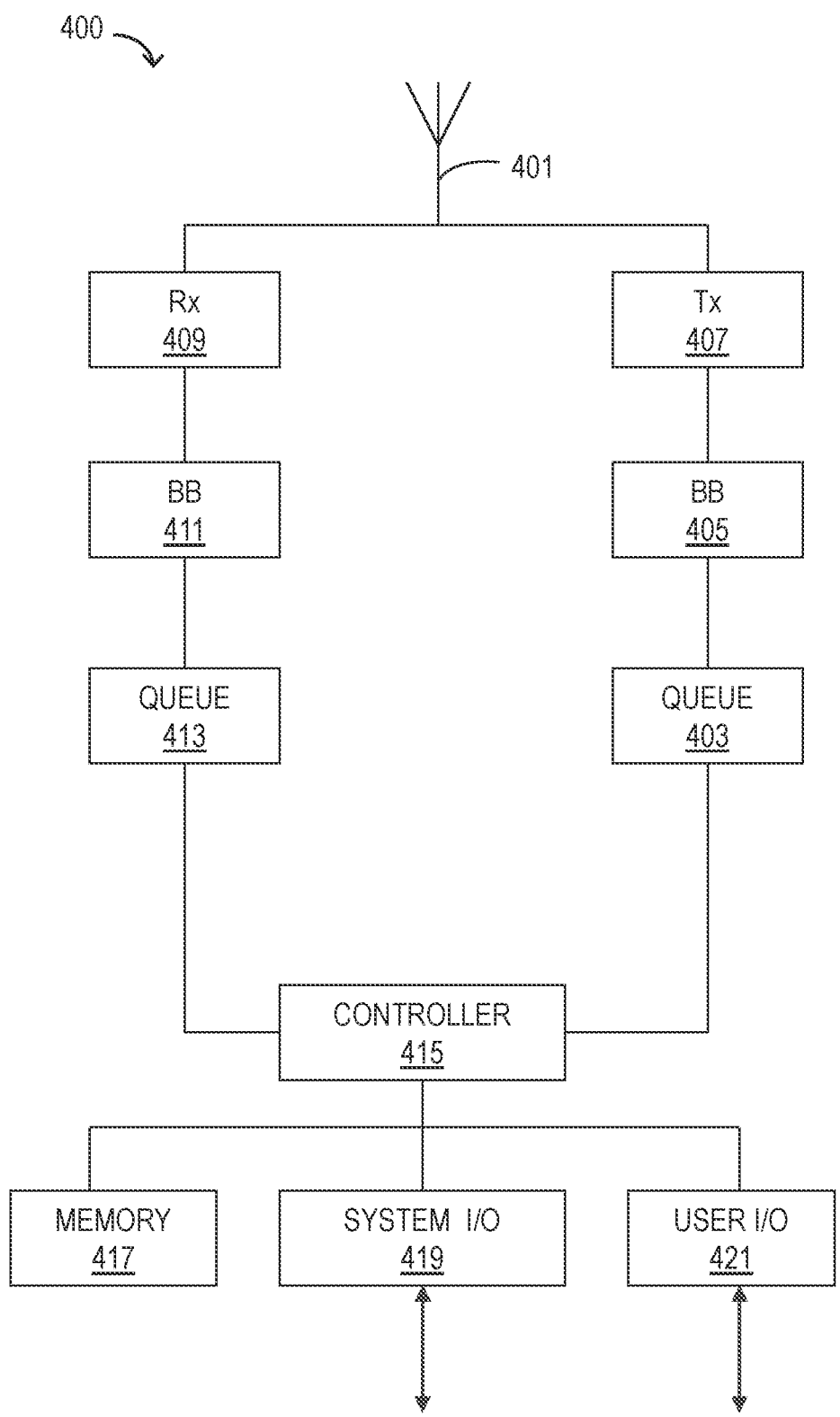
FIG. 4 is a simplified hardware block diagram of a radio terminal.

FIG. 4 is an example hardware diagram of a device architecture suitable for the UE and for a eNB. The hardware 400 includes one or more antenna elements 401. There may be separate transmit and receive arrays, sectorized or diversity antennas or a single omni-directional antenna element. For transmission, data is collected in a transmit queue 403 from which it is transferred to a baseband modulator 405 for conversion to symbols, modulation and upconversion. A transmitter 407 further modulates and amplifies the signal for transmission through the antenna.

On the receive side, received symbols are demodulated and downconverted to baseband in a receive chain 409. The baseband system extracts a bit sequence from the received signal and generates any error detection codes that may be needed. The bit stream is stored in a receive buffer or queue 413 for use by the system.

A controller 415 controls the operation of the receive and transmit chains, applies data to the outbound queue and receives data from the inbound queue. It also generates messages to support the wireless and wired protocols over which it communicates. The controller is coupled to one or more memory systems 417 which may contain software, intermediate cached values, configuration parameters, user data and system data. The controller may also include internal memory in which any one or more of these types of information and data may be stored instead of or in addition to being stored in the external memory system. The controller is coupled to a system input/output interface 419 which allows for communication with external devices and a user input/output interface 421 to allow for user control, consumption, administration and operation of the system.

In the case of an eNB, the system interface 419 may provide access over the S1, OSS and X2 interfaces to the rest of the network equipment to send and receive data, messages, and administrative data. However, one or more of these interfaces may also use the radio interface 401 or another interface (not shown). In the case of a UE, the system interface may connect to other components on the device, such as sensors, microphones, and cameras, as well as to other devices, such as personal computers or other types of wireless networks, through wireless or wired interfaces.

Figure 5:
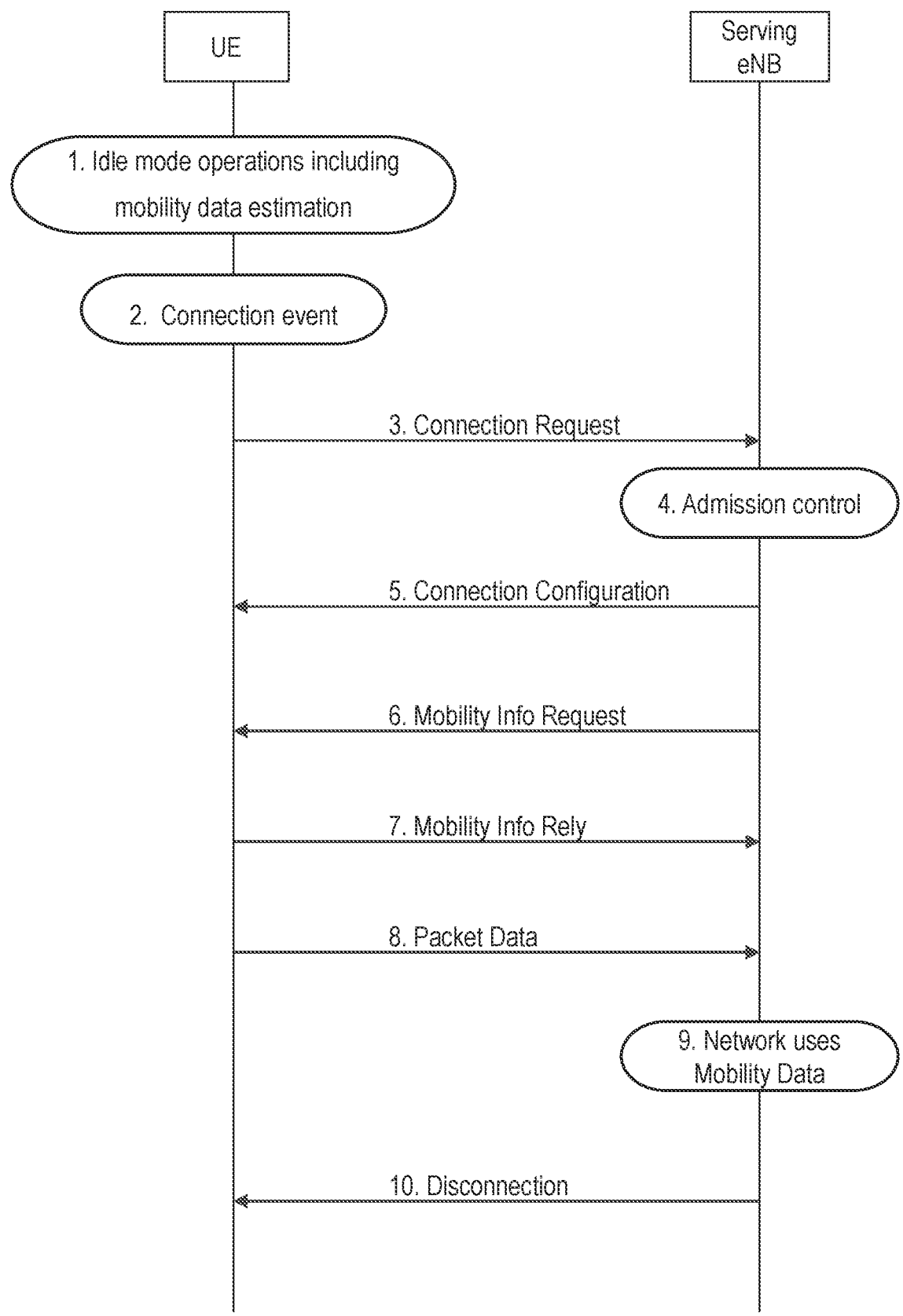
FIG. 5 is a signaling diagram illustrating signaling and equipment operations performed for receiving mobility information.

FIG. 5 is a signaling diagram illustrating aspects of the disclosed techniques. As with the process flow diagrams, additional and alternative operations may be added or subtracted from the illustrated signaling. At the top of the diagram, 1, the UE is performing idle mode operations, which include mobility state estimation. The UE may also be performing other operations such as cell site selection, broadcast synchronization, etc. During idle mode a connection event, 2, occurs. This may be the receipt of a page from the eNB (not shown), a timer wake up, the discovery or introduction of data to send, or any other event.

The UE then sends a connection request, 3, to the serving eNB or a eNB selected during idle mode. The eNB performs admission control, 4, which may include measuring the signal strength or SINR of the received signal. It may also include determining whether channels are available to allocate to the requested connection and, if so, which channels. If the UE is to be admitted, then the eNB sends connection configuration information, 5, and a request for mobility information such as mobility state information, 6. As mentioned above, while Mobility State is a readily available information element in LTE that can easily be requested, other data may be requested instead of, or in addition to Mobility State.

The UE responds with the mobility state information, 7, and packet data communication is established. The network is able to use the mobility information, 9, for any of a variety of different purposes as mentioned above, including system management and channel allocation among different eNBs. After some time the communication between the UE and the eNB is disconnected, 10. The UE then returns to an idle mode, or to an on mode with no active connection and other processes may be performed.

The operations of the flow and signaling diagrams are described with reference to exemplary embodiments. However, it should be understood that the operations of the flow diagrams can be performed by variations other than those discussed with reference to these other diagrams, and the variations discussed with reference to these other diagrams can perform operations different than those discussed with reference to the flow diagrams.

As described herein, instructions may refer to specific configurations of hardware such as application specific integrated circuits (ASICs) configured to perform certain operations or having a predetermined functionality or software instructions stored in memory embodied in a non-transitory computer readable medium. Thus, the techniques shown in the figures can be implemented using code and data stored and executed on one or more electronic devices (e.g., a UE, an eNB, etc.). Such electronic devices store and communicate (internally and/or with other electronic devices over a network) code and data using machine-readable media, such as non-transitory machine-readable storage media (e.g., magnetic disks; optical disks; random access memory; read only memory; flash memory devices; phase-change memory) and transitory machine-readable communication media (e.g., electrical, optical, acoustical or other form of propagated signals—such as carrier waves, infrared signals, digital signals, etc.). In addition, such electronic devices typically include a set of one or more processors coupled to one or more other components, such as one or more storage devices (non-transitory machine-readable storage media), user input/output devices (e.g., a keyboard, a touch screen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment of the invention may be implemented using different combinations of software, firmware, and/or hardware.

The operations of the flow diagrams are described with reference to the exemplary embodiments of the other diagrams. However, it should be understood that the operations of the flow diagrams can be performed by embodiments of the invention other than those discussed with reference to these other diagrams, and the embodiments of the invention discussed with reference to these other diagrams can perform operations different than those discussed with reference to the flow diagrams.

While the flow diagrams in the figures show a particular order of operations performed by certain embodiments of the invention, it should be understood that such order is exemplary (e.g., alternative embodiments may perform the operations in a different order, combine certain operations, overlap certain operations, etc.).

While the invention has been described in terms of several embodiments, those skilled in the art will recognize that the invention is not limited to the embodiments described, can be practiced with modification and alteration. The description is thus to be regarded as illustrative instead of limiting.

The invention claimed is:

1. A method, implemented in a serving node of a radio communications system, for receiving mobility information from a remote terminal, wherein the serving node is configured to establish connection with a plurality of remote terminals through radio links and the method comprises:
   receiving a connection request from the remote terminal;
   measuring a quality of a radio link with the remote terminal based on the received connection request;
   determining whether availability of the radio link is good by comparing a signal to noise ratio of the received connection request to a threshold;
   requesting mobility information from the remote terminal in response to receiving the connection request and in response to determining that the signal to noise ratio exceeds the threshold;
   receiving the requested mobility information from the remote terminal; and
   establishing the requested connection with the remote terminal.

2. The method of claim 1, wherein receiving the connection request comprises receiving an RRC Connection Request message.

3. The method of claim 1, wherein requesting mobility information comprises requesting an estimated mobility state.

4. The method of claim 3, wherein the estimated mobility state is a mobility state estimated by the remote terminal when the remote terminal was in an idle mode.

5. The method of claim 3, wherein requesting the estimated mobility state comprises sending a Measurement Control message to the remote terminal.

6. The method of claim 3, wherein requesting the estimated mobility state comprises requesting a UE (User Equipment) information message that includes radio access capabilities of the remote terminal for different radio frequency band classes.

7. The method of claim 1, wherein requesting mobility information comprises requesting a horizontal Velocity UE (User Equipment) information element from the remote terminal.

8. The method of claim 1, wherein receiving the requested mobility information comprises receiving an estimate made by the remote terminal of a speed of movement of the remote terminal.

9. The method of claim 1, wherein receiving a connection request comprises recovering through a radio link.

10. The method of claim 1, further comprising:
    receiving mobility information from a plurality of other remote terminals; and
    combining the received mobility information from the remote terminal with the received mobility information from the plurality of other remote terminals.

11. A serving node of a radio communications system configured to communicate packet data with a plurality of remote terminals and to obtain mobility information from a remote terminal, the serving node comprising:
    a receiver configured to receive a connection request from a remote terminal;
    a transmitter configured to transmit a request for mobility information from the remote terminal in response to receiving the connection request; and
    a controller configured to control the transmitter and receiver and to:
        measure a quality of a radio link with the remote terminal based on the received connection request;
        determine whether availability of the radio link is good by comparing a signal to noise ratio of the received connection request to a threshold;
        control the transmitter to transmit the request for mobility information in response to receiving the connection request and in response to determining that the signal to noise ratio exceeds the threshold;
        control the receiver to receive the requested mobility information, from the remote terminal; and
        establish the requested connection with the remote terminal.

12. The serving node of claim 11, wherein the requested mobility information comprises an estimate made by the remote terminal of a speed of movement of the remote terminal.

13. The serving node of claim 11, wherein the receiver is further configured to receive requested mobility information from other remote terminals and wherein the controller is configured to combine the received mobility information received from the other remote terminals.

14. The serving node of claim 11, wherein the requested mobility information comprises an estimated mobility state.

15. The serving node of claim 11, wherein the requested mobility information comprises a horizontal Velocity UE (User Equipment) information element determined by the remote terminal.

16. The serving node of claim 11, wherein the connection request comprises an RRC Connection Request message.

* * * * *